United States Patent [19]
Batra et al.

[11] Patent Number: 5,267,112
[45] Date of Patent: Nov. 30, 1993

[54] THIN FILM READ/WRITE HEAD FOR MINIMIZING ERASE FRINGING AND METHOD OF MAKING THE SAME

[75] Inventors: Sharat Batra, Shrewsbury; Seshadri Ramaswamy, Winchester; Michael L. Mallary, Berlin, all of Mass.

[73] Assignee: Digital Equipment Corporation, Maynard, Mass.

[21] Appl. No.: 767,994

[22] Filed: Sep. 30, 1991

[51] Int. Cl.$^5$ .............................. G11B 5/31; G11B 5/23
[52] U.S. Cl. ...................................... 360/119; 29/603; 360/122
[58] Field of Search .................. 360/122, 119; 29/603

[56] References Cited

U.S. PATENT DOCUMENTS

| | | | |
|---|---|---|---|
| 4,351,698 | 9/1982 | Osborne | 156/661.1 |
| 4,951,166 | 8/1990 | Schewe | 360/119 |
| 4,970,616 | 11/1990 | Ramaswamy | 360/122 |
| 5,116,719 | 5/1992 | Gau | 430/313 |

FOREIGN PATENT DOCUMENTS

| | | | |
|---|---|---|---|
| 3806171 | 9/1989 | Fed. Rep. of Germany | 29/603 |
| 62-212910 | 9/1987 | Japan | 360/113 |

Primary Examiner—Constantine Hannaher
Attorney, Agent, or Firm—Arnold, White & Durkee

[57] ABSTRACT

The present invention pertains to a thin film magnetic recording head which minimizes erase fringing and the process for manufacturing the thin film magnetic recording head. The head is used to record and read information made up of alternating magnetization patterns on a magnetic recording medium. Known recording heads cause erase fringing of the magnetic medium during the write operations. The structure of the recording head of the present invention has the ABS portion of one of two magnetic poles beveled away from ABS at the gap to zero throat, reduces erase fringing of the magnetic recording medium and is easily manufactured. By reducing erase fringing, the present invention enables an increase in disk density of information without risking loss of data integrity.

7 Claims, 5 Drawing Sheets

THIN FILM READ/WRITE HEAD FOR MINIMIZING ERASE FRINGING AND METHOD OF MAKING THE SAME

FIELD OF THE INVENTION

The present invention relates to the structure of and process for manufacturing a thin film read/write head, and more particularly to the structure of a thin film head which minimizes erase fringing of the magnetic recording medium and the process for easily and reliably manufacturing the head.

BACKGROUND OF THE INVENTION

Information is stored on a magnetic recording medium such as a disk as alternating magnetization patterns. As is well known, when a thin film head passes over the recording medium, the magnetization patterns on the medium are sensed to read the information stored on the medium. Alternatively, information is written onto the recording medium by passing a thin film head over the medium to store appropriate magnetization patterns.

A typical disk drive system includes a plurality of magnetic disks and a head assembly. The typical head assembly used with a disk drive moves radially towards or away from the axis of rotation of the disks. At any given discrete distance away from the axis of rotation, the recording head is positioned to read or write data from or to a discrete area on one of the almost concentric tracks of the disk.

To record information onto the magnetic medium, the recording head applies a magnetic field to the portion of the medium within the boundary of the desired track. Ideally, the width of the track should equal the width of the recording head so that the induced magnetic field of the head only alters magnetization patterns of the desired track. The trend in the data storage field is to increase the density of the information stored on a disk. One way to accomplish increased density is to increase the number of tracks on the disk. Accordingly, in a high density disk, the distance between adjacent tracks is smaller than in a low density disk.

If the induced magnetic field of the thin film head extends beyond the width of the head and affects the magnetization position on an adjacent track, the information stored on the adjacent track may be corrupted or destroyed. This problem is referred to as erase fringing. The distance away from the sides of the recording head in the track width direction where the magnetic field erases data on the sides of the recording head is called the erase width of the recording head. The problem caused by erase fringing increases as the ratio of the track spacing to the optical width of the heads decreases in high density disks. Therefore, erase fringing limits the potential density of the magnetic medium or disk because sufficient space between the tracks must be maintained to avoid corrupting or erasing adjacent tracks.

Conventional thin film heads contain two rectangular magnetic poles, P1 and P2, which are separated by a thin gap. Pole P1 is typically made a few microns wider than pole P2 in order to avoid magnetic contact between the two poles due to misalignment in the pole P2 process. The erase fringing that occurs when a magnetic field is applied between poles P1 and P2 increases as the difference in the width of the two magnetic poles at the gap increases. This erase fringing occurs because the magnetic field extends beyond the width of the pole P2 at the gap.

One known method to reduce the amount of erase fringing involves modifying the design of the read/write head. In one such modified design, the air bearing surface (ABS) geometry of pole P1 is modified. The ABS geometry denotes the geometry as seen by the magnetic recording medium looking toward the thin film recording head. The rectangular poles P1 and P2 are milled together so that the width of the resulting rectangular pole P1 is equal to the width of rectangular pole P2 at the ABS. The excess material of rectangular pole P1 and P2 that is milled away extends further away from the ABS past the zero throat point. In this known structure, the length from the ABS to where the milling ceases is approximately 4-6 microns. Accordingly, a relatively large amount of material from pole P1 and P2 must be milled away.

In another modified design for a thin film recording head reducing erase fringing, the ABS geometry of pole P1 is milled to form a relatively rectangular portion adjacent the gap and a relatively trapezoidal portion with a larger cross-section area adjacent the rectangular portion. Again, in this design, the length from the ABS to where the milling ceases is approximately 4-6 microns.

Both of the above modified geometries for a thin film recording head reduce the extent of the magnetic field outside the width at the gap and accordingly reduce erase fringing. However, both of the above head geometries require both poles P1 and P2 to have substantially parallel walls adjacent the gap and to be milled away from the ABS well beyond the zero throat point. Both of these head geometries are difficult and time consuming to manufacture and result in a relatively low yield of satisfactory products during high volume manufacturing.

In one known process for making conventional thin film recording heads with plated poles, a base layer of insulating material such as $Al_2O_3$ is deposited on a substrate such as ALSIMAG. A seed layer of material such as NiFe is sputtered over the base layer. Photoresist is next coated over the NiFe seed layer. Next, through a photolithographic process, a window for a pole is formed in the photoresist. After the photoresist is developed, pole material is deposited in the window by electroplating. Now a thin gap layer of material such as $Al_2O_3$ is deposited. Then, a coil structure surrounded by insulation is formed at the yoke region of the poles. Finally, the second pole is plated following the same procedure as described above. Normally, the width of the second pole at its tip is plated to be narrower than the width of the first pole at its tip in order to avoid magnetic contact between the poles at the gap. At this point, a conventional thin film head structure has been formed.

If a more specific head geometry is desired, additional track trimming must be done. Using one known technique for trimming the head to the desired geometry, a thick photoresist mask is placed on the desired portion of the second pole and completely over the yoke. Ion milling is now used to remove excess magnetic material not covered by the photoresist along the width of the two pole portions. Therefore, the width of this photoresist pattern determines the final width of the poles at the gap. The ion milling proceeds along the entire excess depth of the first pole portion to achieve two rectangular pole portions of equal width.

SUMMARY OF THE INVENTION

The present invention is a read/write thin film head having a pole piece structure that reduces erase fringing during the write operation over conventional thin film heads. The thin film head of the present invention has two pole pieces P1 and P2 separated by a gap. Both pole pieces have equal widths at the gap. The sides of the bottom pole P1 are beveled outward away from the gap in the track width direction and the beveling continues away from the ABS to a point where pole P2 angles away from pole P1 and the gap, called the zero-throat point. The geometry or structure of the recording head of the present invention minimizes the magnetic field extending beyond the width of the head thereby minimizing erase fringing. The beveling of pole P1 extends over only a short portion of the length of the rectangular part of the pole and, accordingly, reduces manufacturing time and improves the accuracy of the fabrication process.

The method of manufacturing the thin film head is similar to the conventional track trimming process except the second pole P2 is plated about a micron thicker than is required for adequate magnetic performance. Instead of using a photoresist, the plated pole P2 itself is then used as the mask for pole P1 during ion milling to achieve the above described geometry. Since the beveling extends only up to the zero throat point, a chemical, such as hydrofloric acid, is used to remove the gap material above pole P1 that is not covered by pole P2 up to the zero throat point before beginning the ion milling process. This reduces the manufacturing process time and improves the accuracy of the resulting thin film head geometrics. Since both poles P1 and P2 are made from the same material they etch at about the same rate and after a micron of ion milling, the desired thickness of pole P2 and beveling of pole P1 is achieved.

DETAILED DESCRIPTION OF THE PREFERRED EMBODIMENT

Figure 1:
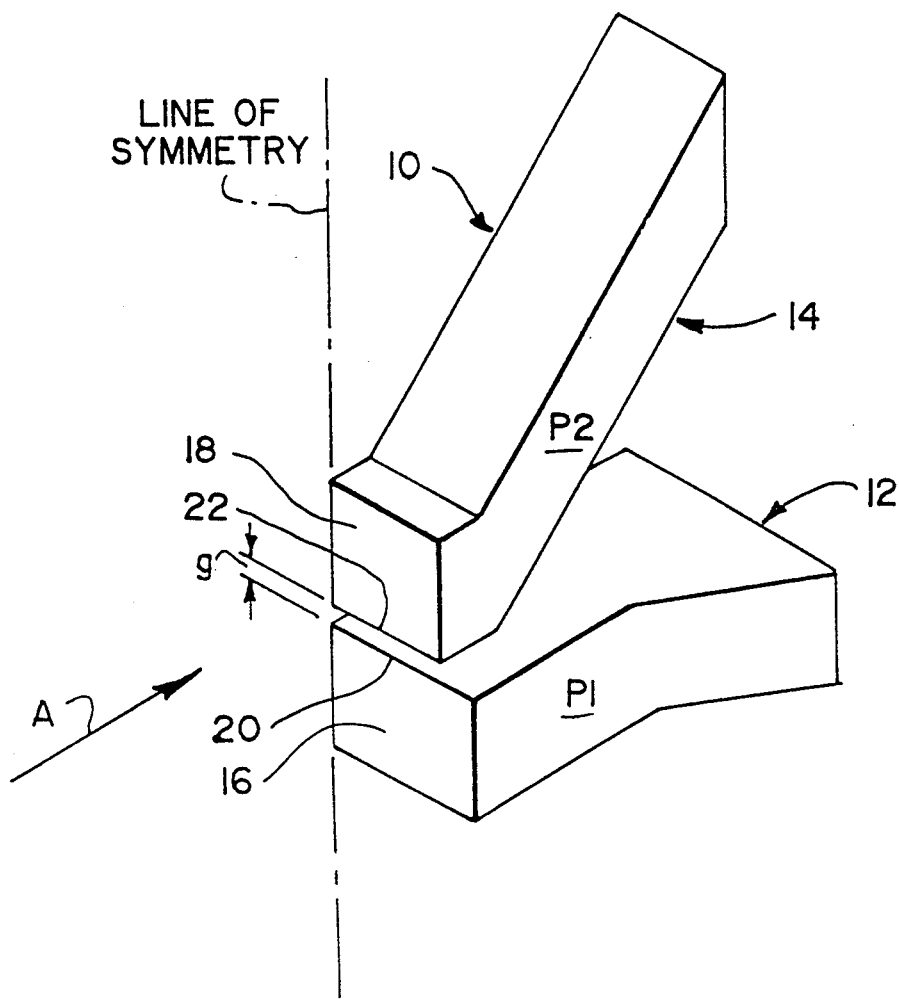
FIG. 1 is a perspective view along a line of symmetry of a conventional thin film recording head having a rectangular pole P1 wider than a rectangular pole P2 at the air bearing surface.

FIG. 1 shows a perspective view along a line of symmetry of a conventional thin film recording head 10 having a first pole (P1) 12 and a second pole (P2) 14. The arrow A points in the direction of the view as seen by the magnetic recording medium, commonly called the Air Bearing Surface (ABS) view. The ABS view shows that poles 12 and 14 have substantially rectangular tip portions 16 and 18, respectively. A gap g separates poles 12 and 14. The width of the front edge 20 of pole 12 is greater than the width of the front edge 22 of pole 14 at the gap g.

Figure 2:
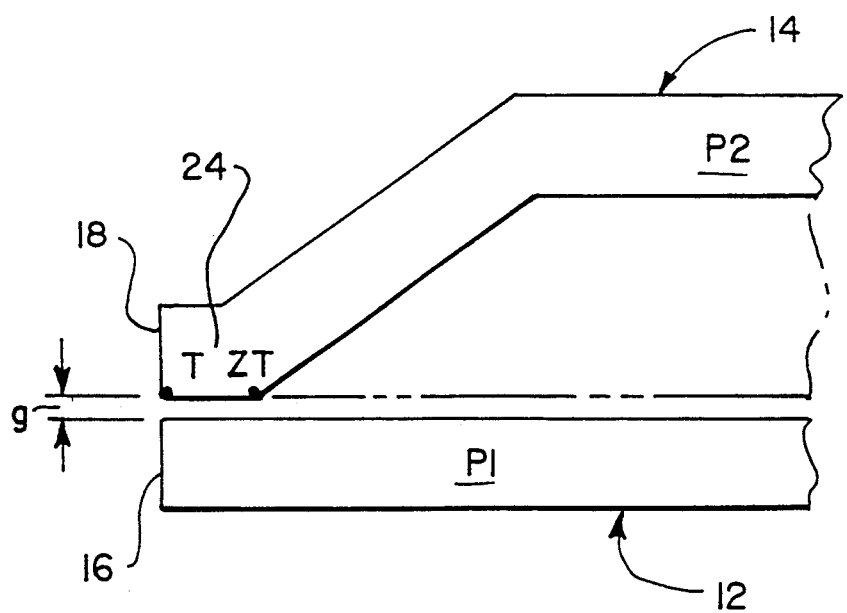
FIG. 2 is a side view of the conventional thin film recording head of FIG. 1.

FIG. 2 shows the side view of the same conventional thin film recording head 10 of FIG. 1. A point T is shown on the tip 18 of pole 14 and a point ZT is shown at a position where pole 14 angles away from the gap g and pole 12. The area between points T and ZT define the throat 24 of pole 14. Point ZT is commonly referred to as zero throat. The remaining standard portions or elements of the head 10 are not illustrated for the sake of simplicity and clarity in the drawings. As is well known in the field, this head design results in significant erase fringing due to the magnetic field between pole 12 and pole 14 extending beyond the width of the head 10.

Figure 3:
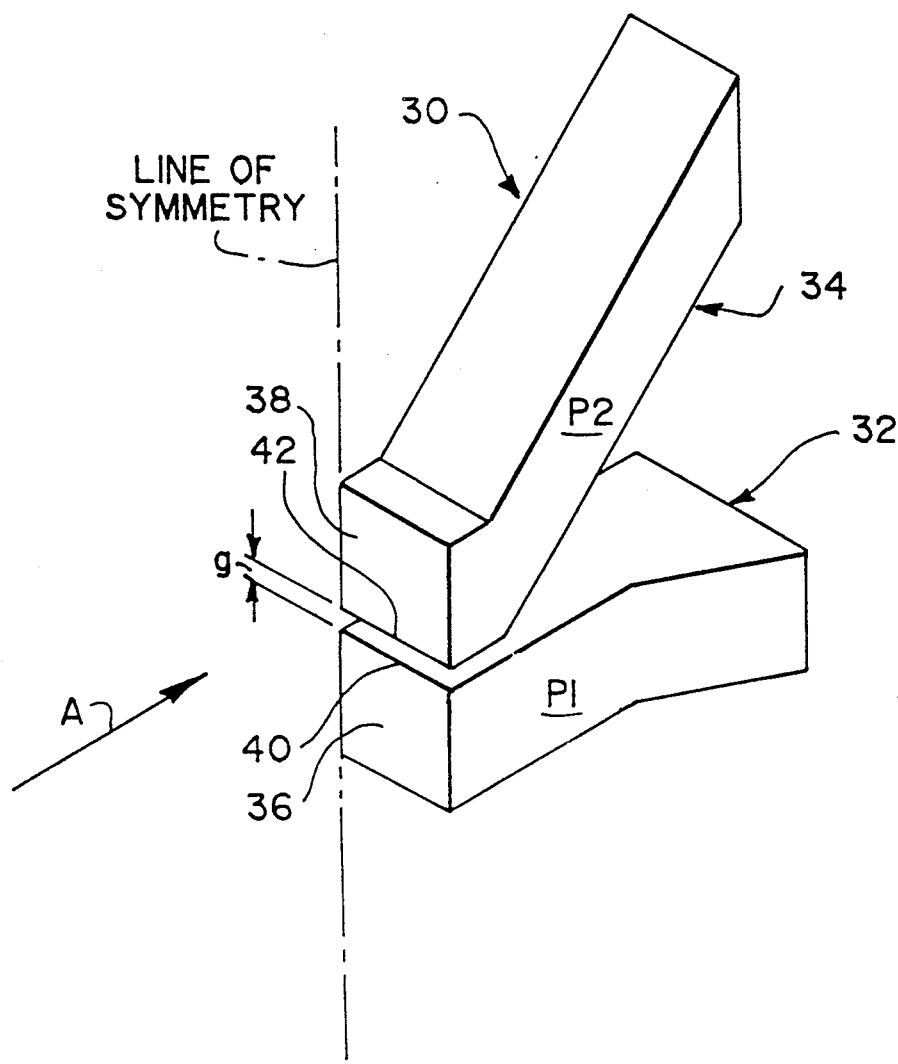
FIG. 3 is a perspective view along a line of symmetry of a thin film recording head having two rectangular poles of equal width at the air bearing surface.

FIG. 3 shows a perspective view along a line of symmetry of a modified thin film recording head 30 having a first pole (P1) 32 and a second pole (P2) 34. The arrow A points in the direction of the ABS view. The ABS view of FIG. 3 shows that poles 32 and 34 have substantially rectangular tips 36 and 38 and front edges 40 and 42, respectively. A gap g separates poles 32 and 34. The width of pole 32 and the width of pole 34 are equal at the tip and away from the tip well past zero throat.

Figure 4:
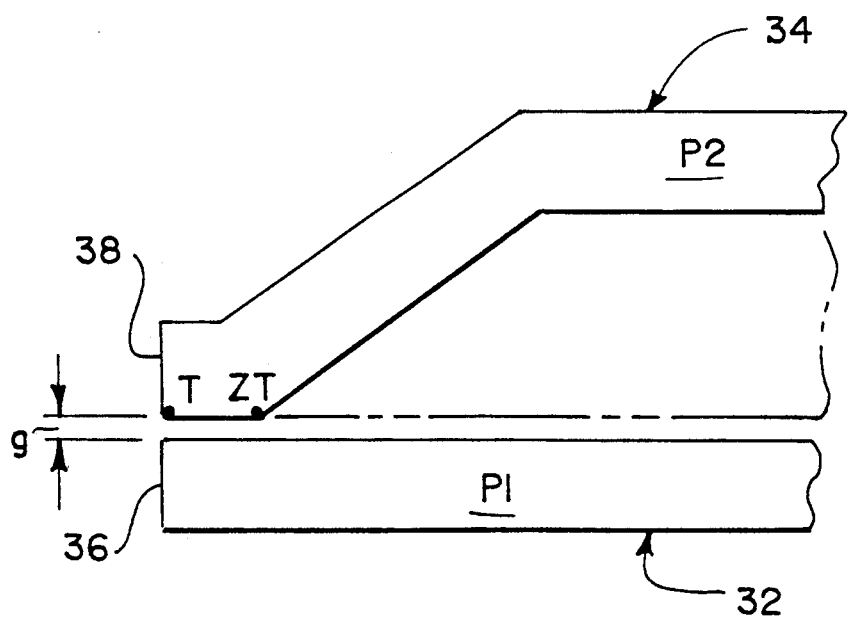
FIG. 4 is a side view of the thin film recording head of FIG. 3.

FIG. 4 shows the side view of the same modified thin film recording head 30 of FIG. 3. A point T is shown on the tip portion 38 of pole 34 and a point ZT is shown at a position where pole 34 angles away from the gap g and pole 32. The throat of pole 34 lies between points T and ZT. The remaining standard portions or elements of the head 30 are not illustrated for the sake of simplicity and clarity in the drawings. The above modified geometry of the thin film head 30 reduces erase fringing over the conventional thin film head design shown in FIGS. 1 and 2. To achieve the width of rectangular pole (P1) 32 equal to the width of rectangular pole (P2) 34 a substantial amount of expensive and time-consuming milling and trimming of P1 and P2 is required. The trimming of pole P1 away from ABS must proceed well past zero throat about 4-6 microns.

Figure 5:
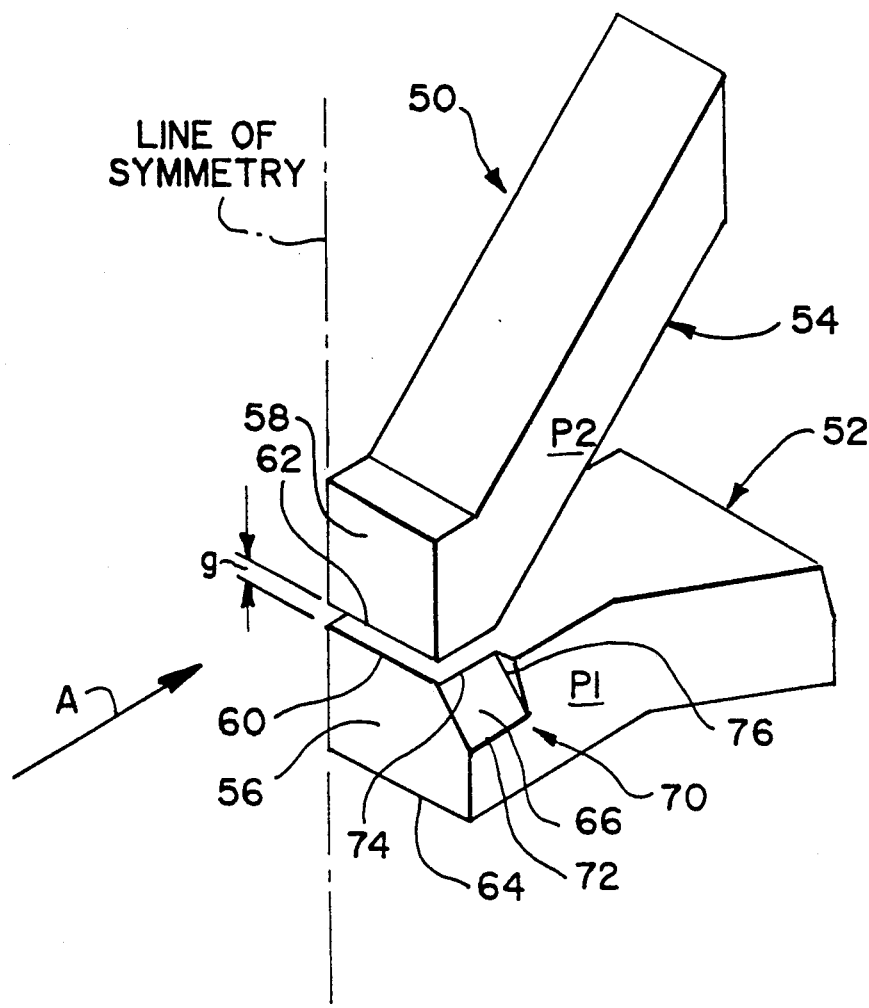
FIG. 5 is a perspective view along a line of symmetry of a thin film recording head of the present invention.

FIG. 5 shows a perspective view along a line of symmetry of a thin film recording head 50 of the present invention. The head 50 has a first pole (P1) 52 and a second pole (P2) 54. The poles 52 and 54 are separated by a gap g. The ABS view of FIG. 5 shows that the tip portion 56 pole (P1) 52 is not rectangular and that the tip portion 58 of pole (P2) 54 is substantially rectangular. The width of front edge 60 of pole (P1) 52 and the width of front edge 62 of pole (P2) 54 at the gap g are substantially equal. However, the width of back edge 64 of pole (P1) 52 opposite the gap is greater than the width of front edge 60 of pole (P2) 54 at the gap. In the preferred embodiment, back edge 64 of pole (P1) 52 is about a micron wider than the width of front edge 60 of pole (P2) 54. A joinder portion 66 of pole (P1) 52 angles away at approximately a 45 degree angle from front edge 62 of pole (P2) 54. FIG. 5 further shows a side wall portion 70 of pole (P1) 52 lying in a plane. The top edge 72 of the wall 70 also is lying in the plane. The material removed from the corner of pole (P1) 52 during manufacturing results in an edge 74 extending away from the surface 56 to the zero throat point illustrated by line 76. The edge 74 is lying in a plane substantially parallel to and spaced from the plane containing edge 72. The joinder portion 66 connects the plane of edge 72 with the plane of edge 74.

Figure 6:
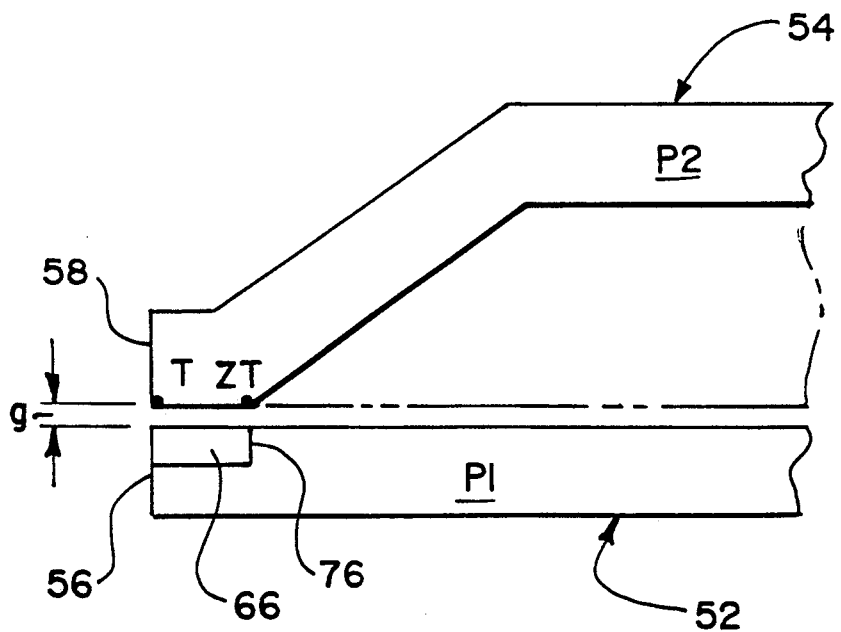
FIG. 6 is a side view of the thin film recording head of the present invention shown in FIG. 5.

FIG. 6 shows the side view of the recording head FIG. 5. As shown in FIG. 6, pole (P1) 52 is beveled to approximately the point ZT at zero throat, about a micron and a half away from ABS. Thus, with the present invention, only a small amount of ion milling is required compared to the extensive ion milling required for thin film recording heads of the design shown in FIG. 3. The erase fringing which occurs with the present invention is also dramatically decreased as compared with the erase fringing caused by the recording head shown in FIG. 1.

Figure 7:
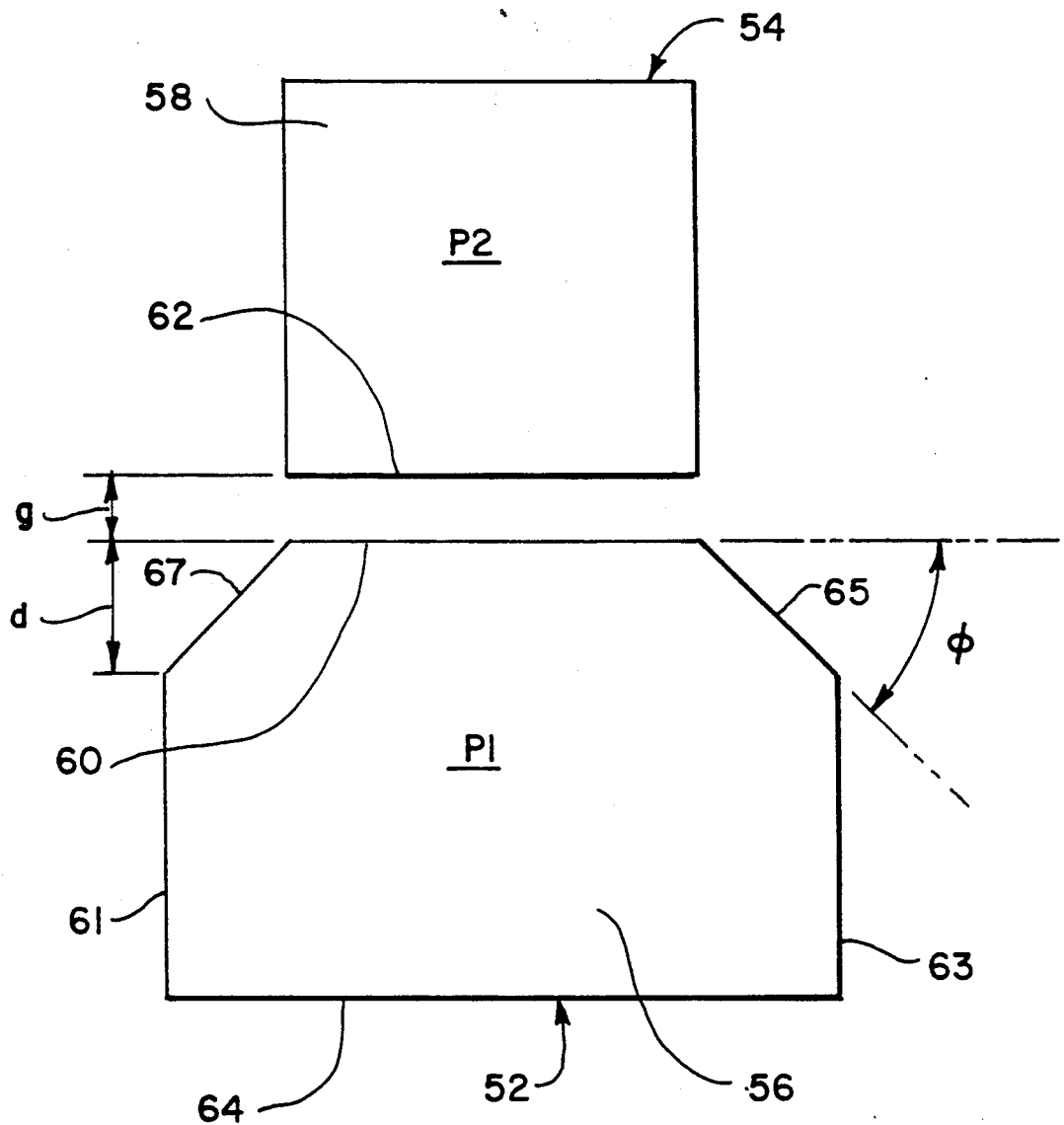
FIG. 7 is an air bearing surface view of the thin film recording head of the present invention shown in FIG. 5.

FIG. 7 shows an ABS view of the thin film recording head of the present invention shown in FIG. 5. The ABS view shows the tip portions 56 and 58 of pole portions 52 and 54, respectively. The front edges 60 and 62 of pole portions 52 and 54, respectively, are also shown and are of substantially equal width at the gap. The left and right side edges of pole 52 include the portions or legs 61 and 63 which are substantially normal to the back edge 64 and angled portions or legs 65 and 67. The legs 65 and 67 are preferably at approximately a 45 degree angle. In the preferred embodiment, the back edge 64 is 2 microns wider than the front edge 62 of pole (P2) 58 and the distance d that each side edge is beveled equals one micron.

Of course, the angle of the bevel can be any other degree without departing from the scope of the present invention. If the angle of the beveling is increased, additional material from pole (P1) 52 is removed. This results in a marginal reduction of erase fringing. If the angle of the beveling is decreased, less material from pole (P1) 52 would be removed. As the angle approaches zero, the geometry of the present invention approaches that of the conventional thin film recording head shown in FIG. 1 and the ability of the resulting recording head to reduce erase fringing is substantially decreased.

Other embodiments of the present invention can be achieved by removing additional material from pole P1. For example, in another embodiment of the present invention, pole P1 is ion milled so that the width of pole P1 equals the width of pole P2 at the gap. The ion miling of P1 achieves an almost 90 degree angle with respect to side 60 of pole P2 and also removes a few microns of material from pole P1. The resulting geometry of pole P1 has a substantially rectangular portion at the gap and a substantially rectangular portion of greater width away from the gap. In the above described embodiments of the present invention, the ion milling proceeds away from the ABS to about zero throat. Further, the exact geometries of the above described embodiments of the present invention are aspirational. The actual milling and manufacturing of thin film recording heads is imprecise due to their deminimis size. In actual practice, exact geometries or precise angles are difficult to achieve.

The magnetic field which causes erase fringing is made up of vertical, transverse and longitudinal components. The longitudinal component is directed along the recording medium direction of motion, the vertical component is directed normal to the plane of the medium, and the transverse component is directed along the track width direction.

Figure 8:
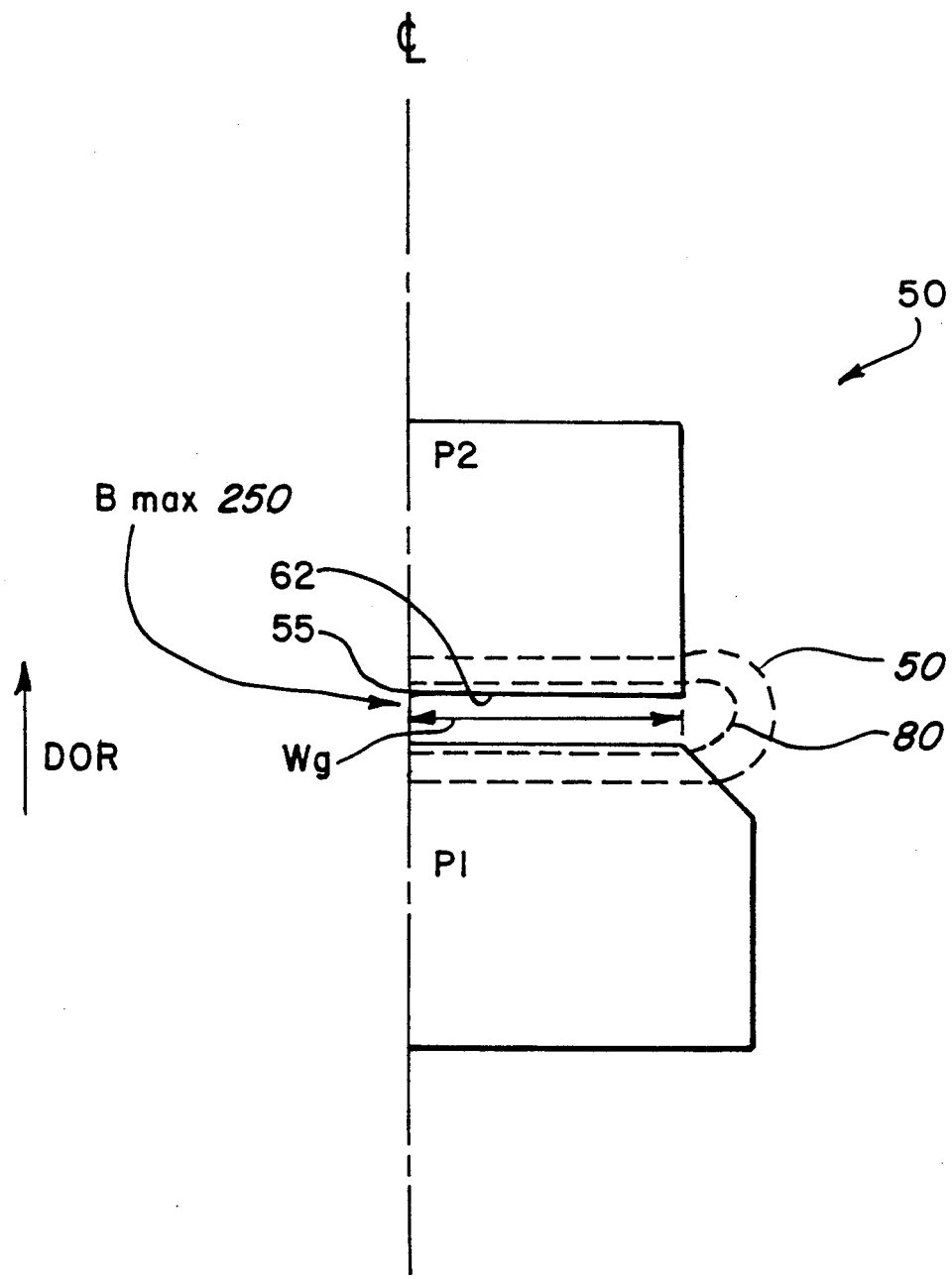
FIG. 8 is an air bearing surface view along a line of symmetry of the longitudinal magnetic field distribution at the midplane of the medium from the thin film recording head of the present invention shown in FIG. 5.

In FIG. 8, an ABS view along a line of symmetry of a recording head 50 of the present invention is shown. The head is comprised of two poles P1 and P2 and a gap g therebetween. During the recording process, the magnetic recording medium will pass by the pole P1 across the gap g and to pole P2 in the direction indicated by the arrow DOR. The influence that pole P1 has upon the medium during recording in the central region is overridden by the flux at the gap and at the adjacent region of pole P2. The track width of recorded data created in the medium caused by the action of recording head 50 is approximately the width Wg of the recording head at the gap plus the write fringing caused by magnetic fields outside the width of the gap.

Longitudinal field contours in the midplane of the magnetic medium in relation to poles P1 and P2 and gap g are shown by dotted lines. Corresponding contours exist for transverse fields of magnetic recording head 50, but have been omitted for simplicity of description only. FIG. 8 shows that a contour of +50 encompasses a portion of pole P1 and a portion of pole P2 substantially centered about gap g. Within this +50 contour, a +80 contour is defined. The two aforementioned contours are all substantially centered about gap g. Of course, gradients exists within and between the contours as shown. For example, the flux density in a thin region 55 located adjacent front edge 62 of pole piece P2 will be between +80 and +250 units. In FIG. 8, the contour +80 represent the extent of the erase/write width for the magnetic medium whose coercivity is equal to +80.

Under similar operating conditions, the longitudinal magnetic field contours for a conventional thin film recording head extend further away from the sides of the recording head than the contours shown in FIG. 8 and contribute significantly to additional erase fringing. The longitudinal magnetic field contours for plus 80 of the present invention are comparable to the plus 80 contours for the head geometry shown in FIG. 3. Therefore, the present invention has a similar erase width as the head geometry shown in FIG. 3.

Similarly, the design of the present invention reduces the extent of transverse magnetic fields outside the width of the recording head. The reduction of the transverse magnetic fields contributes to the reduction of erase fringing and also helps to minimize inter-symbol interference during the writing of closely spaced bits and reduce the width of the pulse during readback (PW50). Minimizing inter-symbol interference and reducing the width of (PW50) provides for increased linear density of the recording medium.

By reducing the extension of longitudinal and transverse magnetic fields outside of the width of the head, the present invention substantially reduces erase width over conventional thin film heads and also has an erase width comparable to thin film recording heads shown in FIG. 3 which require an extensive and less reliable manufacturing process.

Table 1 shows the erase widths of thin film recording heads shown in FIGS. 1, 3 and 5 for various ratios of Hg/Hc. Hg/Hc represents the ratio of the strength of the magnetic field at the midplane of the medium to the coercivity of the recording medium. As is well known in the field, to achieve a successful overwrite on the recording medium Hg/Hc should be greater than or equal to 2.5. Of course, for higher ratios of Hg/Hc the magnetic medium coercivity is more easily overcome; however, the erase width is also increased. For Hg/Hc equal to 2.5, Table 1 shows that the erase width for conventional thin film recording heads equals 292 micro inches, the erase width for the present invention equals 265 micro inches, and the erase width for the thin film recording head of FIG. 3 equals 262 micro inches. Thus, Table 1 shows that 90% (27/30) of the improvement achieved by extensive and substantial ion milling of the recording head in FIG. 3 can be obtained by the present invention which simply bevels pole P1 one micron at 45 degrees to zero throat.

TABLE 1

| Head Type | ERASE WIDTH ($H_g/H_c$) | | | |
|---|---|---|---|---|
| | 2 | 2.5 | 3.0 | 4.0 |
| FIG. 1 (Conventional thin film head 6.0/8.0) | 270 $\mu''$ | 292 $\mu''$ | 313 $\mu''$ | 340 $\mu''$ |
| FIG. 3 (Rectangular thin film head 6.0/6.0) | 252 $\mu''$ | 262 $\mu''$ | 274 $\mu''$ | 292 $\mu''$ |
| FIG. 5 (Present invention 6/8 beveled) | 254 $\mu''$ | 265 $\mu''$ | 280 $\mu''$ | 317 $\mu''$ |

Moreover, the simplicity in the design of the present invention allows for ease in manufacturing. The main steps in one method of making the thin film recording head of the present invention shown in FIG. 5 is to deposit a base layer of insulating material such as $Al_2O_3$ on a substrate such as ALSIMAG, sputter a seed layer of material such NiFe over the base layer, and coat the NiFe seed layer with a photoresist. Then, form a window in the photoresist for a pole P1 using a photolithographic process, and when developed, deposit the pole material in the window by electroplating. Next, add a thin gap layer of material such as $Al_2O_3$ and then add a coil structure surrounded by insulation at the yoke region of the poles. Then, plate the second pole P2 in a similar fashion. In the preferred method of making the thin film recording head of the present invention shown in FIG. 5, pole P2 should be plated about one micron thicker than the final desired thickness of pole P2 and also about 2 microns narrower than the width of pole P1.

To trim the head, use a chemical, such as Hydrofluoric Acid to remove much of the gap material above pole P1 not covered by pole P2 up to zero throat. Then, ion mill about one micron of the excess material from pole P2 to achieve the desired thickness of pole P2. Alternatively, pole P2 could be plated slightly thicker and the gap material could be removed by ion milling. As the ion milling progresses, the portion of pole P1 underneath P2 that is not protected from the ion beam will be beveled at approximately 45 degrees due to the angle of the ion milling reaching that portion of pole P1. The width of poles P1 and P2 at the gap will also be equal. The result is a design for a recording head which reduces erase fringing while minimizing the amount of complex ion milling required. Due to the simplicity of the manufacturing process, a higher quality product is produced with less defective recording heads. In the preferred embodiment shown in FIG. 5, the ion milling time is reduced to about one-sixth of the time required for ion milling the geometry shown in FIG. 3.

An alternate method of making the thin film recording head of the present invention is to repeat the method described above except increase the thickness of pole P2 before ion milling. By increasing the thickness of pole P2, a longer duration of ion milling will be required. As pole P2 is being ion milled, the material of pole P1 that is not protected by pole P2 will be ion milled further away from the gap. Thus, various designs of pole P1 are achieved by varying the thickness of pole P2 and the duration of the ion milling.

Another alternate method of making the thin film recording head of the present invention is to repeat the method described above and add an additional step of removing the photoresist material on top of pole P1. Before the gap material is removed by the Hydrofluoric Acid, a Plasma-Ash process is used to remove the photoresist material above pole P1 not covered by pole P2 and past zero throat. Then, the ion milling process shapes pole P1 at the ABS and also removes some of the material from pole P1 beyond zero throat. As previously explained, the geometry of the head shown in FIG. 5 is the preferred embodiment. Such a configuration and the realization that such a configuration substantially reduces or eliminates erase fringing is one of the fundamental improvements of the present invention. In addition, removing additional material from pole P1 beyond zero throat while requiring additional ion milling time does result in a marginal increase in recording head performance over the configuration shown in FIG. 5 while still providing a significant improvement over the prior art.

The preferred embodiment of the present invention describes a thin film recording head geometry which substantially reduces erase fringing and is easily manufactured. The scope of the present invention is intended to cover all variations and substitutions which are and become apparent from the above illustrative embodiment of the present invention.

What is claimed is:

1. A magnetic recording head for reducing erase fringing have at least first and second poles, the distal end of each pole having a tip portion lying in a plane defining the air bearing surface for cooperation with a magnetic medium,
   said first pole being positioned relative to said second pole to form a gap therebetween,
   said tip of said first pole having a front edge adjacent said gap, a back edge away from said gap, a left side edge and a right side edge,
   said tip of said second pole being substantially rectangular and having a front edge adjacent said gap,
   said front edge of said top of said first pole being substantially equal in length to said front edge of said tip of said second pole,
   both said left and right side edges having a first portion extending away from said gap at an angle,
   said first pole having a throat portion extending away from said tip to a zero throat point,
   said first pole having a cross sectional shape substantially the same from said tip to substantially said zero throat point and a different cross sectional shape thereafter.

2. A magnetic recording head as set forth in claim 1 wherein both said left and right side edges having a second portion substantially normal to the back edge connecting said first portion to said back edge.

3. A magnetic recording head as set forth in claim 1 wherein said angle is substantially 45°.

4. A magnetic recording head having at least two poles, each pole terminating in a pole tip in a plane defining an air bearing surface for cooperation with a magnetic medium operating essentially parallel to the air bearing surface, with the pole tips separated by a gap in width transversely between the pole tips, comprising:

a first pole and a second pole, said first pole being positioned relative to said second pole to form a gap therebetween;

said first and second poles each having a tip portion;

said tip portion of said first pole having a beveled portion extending away from said second pole and the width of said first pole and said second pole being substantially equal at said gap;

said beveled portion of said first pole extending to substantially the zero throat point.

5. A method for manufacturing a thin film magnetic recording head having at least a first and second pole on a substrate, comprising the steps of:

fabricating said first and second poles around a gap material and an insulated coil structure, said first pole being wider than said second pole and the thickness of said second pole being greater than a final desired thickness for said second pole, removing at least some of the gap material above said first pole to form a gap between said first and second poles, ion milling said first and second poles, using said second pole as a mask, to remove material from said second pole thereby reducing the thickness of said second pole to a final desired thickness and to remove some material from said first pole at the portion extending beyond said second pole forming left and right side edges extending away from said gap at an angle and extending to substantially a zero throat point.

6. The method of claim 5 wherein said step of removing said gap material includes removing said gap material above the extending portions of said first pole up to substantially a zero throat point.

7. The method of claim 6 wherein said step of removing said gap material includes the application of a chemical material.

* * * * *